(12) United States Patent
Yanagisawa

(10) Patent No.: US 8,693,109 B2
(45) Date of Patent: Apr. 8, 2014

(54) PROJECTOR LENS SYSTEM AND PROJECTOR APPARATUS

(71) Applicant: Toshiyuki Yanagisawa, Suwa (JP)

(72) Inventor: Toshiyuki Yanagisawa, Suwa (JP)

(73) Assignee: Nittoh Kogaku K.K., Suwa-Shi, Nagano (JP)

( * ) Notice: Subject to any disclaimer, the term of this patent is extended or adjusted under 35 U.S.C. 154(b) by 0 days.

(21) Appl. No.: 13/647,748

(22) Filed: Oct. 9, 2012

(65) Prior Publication Data

US 2013/0088789 A1    Apr. 11, 2013

(30) Foreign Application Priority Data

Oct. 11, 2011   (JP) ................... 2011-223762

(51) Int. Cl.
*G02B 13/18* (2006.01)
(52) U.S. Cl.
USPC ............ 359/715; 359/649; 359/650; 359/651
(58) Field of Classification Search
USPC ......................................... 359/715, 649–651
See application file for complete search history.

(56) References Cited

U.S. PATENT DOCUMENTS 7,057,830 B2 * 6/2006 Ebbesmeier .................. 359/755

FOREIGN PATENT DOCUMENTS

JP        2001-116990         4/2001

* cited by examiner

*Primary Examiner* — James Jones
(74) *Attorney, Agent, or Firm* — Thompson Hine LLP

(57) ABSTRACT

A projector lens system is provided. The projector lens system comprising, in order from a screen side thereof: a first negative lens that is made of resin and is convex on the screen side; a first positive lens that is made of glass and is biconvex; a stop; a cemented lens that has negative refractive power and is composed, in order from the screen side, of a second negative lens that is made of glass and a second positive lens that is made of glass; and a third positive lens that is made of resin, wherein a refractive index n1 of the first negative lens, a refractive index n2 of the first positive lens, a refractive index n32 of the second positive lens, and a refractive index n4 of the third positive lens satisfy the following conditions: $1.45 \leq n1 \leq 1.60$; $1.45 \leq n4 \leq 1.60$; $0.16 \leq n2-n1 \leq 0.31$; $0.16 \leq n32-n4 \leq 0.31$; $0.95 \leq n1/n4 \leq 1.05$; and $0.95 \leq n2/n32 \leq 1.05$.

6 Claims, 3 Drawing Sheets

Fig. 4

| Lens surface number | Ri | di | nd | νd | Lens name | | Focal distance | | Maximum effective ray height |
|---|---|---|---|---|---|---|---|---|---|
| Screen | Flat | | | | | | | | |
| 1 | 134.83 | 2.84 | 1.53116 | 56.0 | L1 | | -23.1 | | 12.3 |
| 2 | 11.24 | 14.07 | | | | | | | |
| 3 | 23.96 | 4.04 | 1.80400 | 46.6 | L2 | | 24.3 | | 9.8 |
| 4 | -103.68 | 9.20 | | | | | | | |
| Stop | Flat | 8.34 | | | | | | | |
| 5 | -11.05 | 4.23 | 1.78472 | 25.7 | L31 | LB | -10.1 | -275.7 | 8.9 |
| 6 | 35.53 | 5.64 | 1.80400 | 46.6 | L32 | | 14.6 | | 9.5 |
| 7 | -16.54 | 0.20 | | | | | | | |
| 8 | 21.05 | 6.30 | 1.53116 | 56.0 | L4 | | 27.5 | | 11.0 |
| 9 | -43.62 | 6.80 | | | | | | | |
| Prism | Flat | 16.00 | 1.58913 | 61.2 | | | | | |
| | Flat | 2.00 | | | | | | | |
| Cover glass | Flat | 0.65 | 1.48749 | 70.2 | | | | | |
| | Flat | 0.20 | | | | | | | |
| Light valve | Flat | | | | | | | | |

Fig. 5A

| | |
|---|---|
| Focal distance [mm] | 15.00 |
| F number | 2.00 |
| Back focus [mm] | 25.65 |
| Back focus (in air) [mm] | 19.48 |
| L1~L4[mm] | 54.86 |
| L1~cover glass [mm] | 80.51 |
| Image height [mm] | 7.90 |
| Half angle [°] | 28.00 |
| Stop diameter [mm] | 10.40 |

Fig. 5B

| | K | A | B | C | D |
|---|---|---|---|---|---|
| S1 | -7.631453 | -1.4333E-05 | 4.0656E-08 | -1.5559E-10 | 3.7946E-13 |
| S2 | -0.786713 | -4.5320E-06 | 2.1763E-08 | -2.5550E-10 | 2.3453E-12 |
| S8 | -0.006991 | -4.5300E-06 | 4.2872E-08 | -2.2355E-11 | 2.0127E-12 |
| S9 | -3.165257 | 3.7209E-05 | -5.0030E-08 | 7.6408E-10 | -3.4574E-13 |

PROJECTOR LENS SYSTEM AND PROJECTOR APPARATUS

CROSS-REFERENCE TO RELATED APPLICATIONS

This application is based upon and claims the benefit of priority from the prior Japanese Patent Application No. 2011-223762, filed Oct. 11, 2011, the entire contents of which are incorporated herein by reference.

BACKGROUND

The present invention relates to a projector lens system of a projector apparatus.

Japanese Laid-Open Patent Publication No. 2001-116990 discloses a projector lens that is bright with an F number of around 2.4, has high resolving power in spite of having a wide angle of view with a half angle of at least 45 degrees, has a sufficiently long back focus for the provision of a color synthesizing means, and has favorable telemetric characteristics. To do so, the projection lens in Publication No. 2001-116990 is constructed, from the enlarging side to the reducing side, of a first lens group I with negative refractive power, a second lens group II with positive refractive power, and a third lens group III with positive refractive power, with a comparatively long spacing provided between the first lens group I and the second lens group II, the first lens group I entirely composed of negative lenses, and the lens that is closest to the reducing side out of the lens group I having an aspherical surface.

SUMMARY

In applications such as presentations and in education, there is demand for a projector lens system that is compact and low cost.

One aspect of the present invention is a projector lens system that projects projection light from a light modulator onto a screen. This projector lens system includes, in order from a screen side thereof: a first negative lens (negative meniscus lens) that is made of resin and is convex on the screen side, with both surfaces of the negative meniscus lens are aspherical; a first positive lens that is made of glass and is biconvex; a stop; a cemented lens that has negative refractive power and is composed, in order from the screen side, of a second negative lens that is made of glass and is biconcave and a second positive lens that is made of glass and is biconvex; and a third positive lens that is made of resin and is biconvex, with both surfaces of the third positive lens are aspherical, wherein a refractive index n1 of the first meniscus lens, a refractive index n2 of the first positive lens, a refractive index n32 of the second positive lens, and a refractive index n4 of the third positive lens satisfy the following conditions $$1.45 \leq n1 \leq 1.60 \tag{1}$$

$$1.45 \leq n4 \leq 1.60 \tag{2}$$

$$0.16 \leq n2-n1 \leq 0.31 \tag{3}$$

$$0.16 \leq n32-n4 \leq 0.31 \tag{4}$$

$$0.95 \leq n1/n4 \leq 1.05 \tag{5}$$

$$0.95 \leq n2/n32 \leq 1.05 \tag{6}$$

In this projector lens system, the first negative lens and the first positive lens, and the cemented lens with negative power and the third positive lens are disposed on respective sides of the stop. That is, in this projector lens system has the retrofocal arrangements with negative power and positive power, are disposed on respective sides of the stop asymmetrically. A lens system where negative-positive retrofocal arrangements are disposed on both sides of the stop is wide angle, is easy to make telecentric on the incident side, and facilitates achievement of a sufficient back focus. However, there are the disadvantages of a tendency for various aberrations to increase due to the arrangement of powers being asymmetrical and, if the number of lenses is increased to correct such aberrations, a tendency for the size and/or cost of the lens system to increase.

In this projector lens system, as shown by Conditions (1) to (4), the refractive index n1 of the first negative lens (negative meniscus lens) and the refractive index n4 of the third positive lens that are both made of resin are set low and the refractive index n2 of the first positive lens and the refractive index n32 of the second positive lens that are both made of glass are set high. In addition, according to Condition (5) the refractive index n1 of the first negative lens and the refractive index n4 of the third positive lens are set so as to be substantially balanced (i.e., substantially equal) and according to Condition (6) the refractive index n2 of the first positive lens and the refractive index n32 of the second positive lens are set so as to be substantially balanced (i.e., substantially equal).

According to the above conditions (1) to (6), in this projector lens system, by sandwiching the first positive lens and the second positive lens that have substantially equal high refractive indices between the first negative lens and the third positive lens that have substantially equal low refractive indices, although the arrangement of powers on both sides of the stop is asymmetrical in the form of negative-positive, negative-positive, it is possible to make the arrangement of refractive indices symmetrical in the form of low-high, high-low, on both sides of the stop.

By such arrangements, Petzval factors of the first negative lens and first positive lens, and the cemented lens and third positive lens are cancelled each other, hence the Petzval sum of the entire lens system is reduced. That makes it possible to favorably correct various aberrations such as curvature of field. This means that it is possible to provide a high-performance projector lens system while using a lens configuration that is compact with a total of five lenses and is low-cost by using two lenses that are made of resin.

As described, this projector lens system has the arrangement of powers on the respective sides of the stop is asymmetrical in the form of negative-positive, negative-positive, but the materials of the respective lenses are symmetrical in the form of resin-glass, glass-resin. This means that by changing the order of the powers of the lenses and the materials of the lenses, it is easy to distribute the powers of the lenses and the effects of temperature with a favorable balance.

The projector lens system should preferably also satisfy the following conditions.

$$1.50 \leq n1 \leq 1.55 \tag{1'}$$

$$1.50 \leq n4 \leq 1.55 \tag{2'}$$

$$0.20 \leq n2-n1 \leq 0.28 \tag{3'}$$

$$0.20 \leq n32-n4 \leq 0.28 \tag{4'}$$

$$0.98 \leq n1/n4 \leq 1.02 \tag{5'}$$

$$0.98 \leq n2/n32 \leq 1.02 \tag{6'}$$

In this projector lens system, a maximum effective ray height h1 of the first negative meniscus lens, a diameter hs of the stop, and a maximum effective ray height h4 of the third positive lens should preferably satisfy Conditions (7) and (8) below.

$$1.00 \leq h1/hs \leq 1.20 \quad (7)$$

$$1.00 \leq h4/hs \leq 1.20 \quad (8)$$

In this projector lens system 10, by setting the parameters within the ranges of Conditions (7) and (8), it is possible to make the effective rays on an enlarging side and a reducing side of the stop substantially equal, which means that it is possible to provide a projector lens system that suppresses a drop in peripheral light and is compact and bright.

This projector lens system should preferably also satisfy the following conditions.

$$1.15 \leq h1/hs \leq 1.18 \quad (7')$$

$$1.05 \leq h4/hs \leq 1.10 \quad (8')$$

Another aspect of the present invention is a projector (projecting apparatus) including the projector lens system described above, a light modulator, and a lighting system that emits light onto the light modulator. The lighting system should preferably include an LED light source.

BRIEF DESCRIPTION OF THE DRAWINGS

FIG. 4 is a table showing lens data of the projector lens system;

FIGS. 5A and 5B are diagrams showing various numeric values of the projector lens system, with FIG. 5A showing basic data and FIG. 5B showing aspherical surface data.

DETAILED DESCRIPTION

Figure 1:
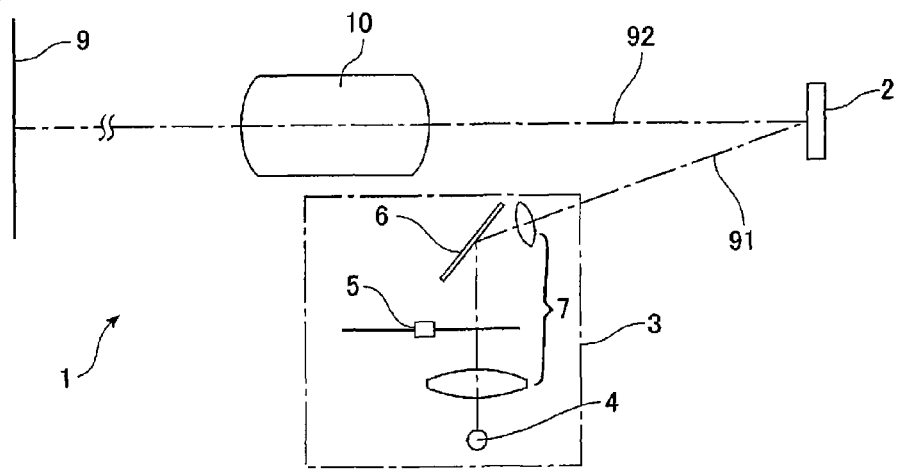
FIG. 1 shows an arrangement of a projector apparatus that uses a projector lens system according to the present invention.

FIG. 1 shows an arrangement of a projector (projecting apparatus) that uses a projector lens system according to the present invention. The projector 1 includes a light modulator (light valve) 2, a lighting system (light emitting system) 3 that emits illumination light 91 to be modulated by the light valve 2, and a projector lens system 10 that projects projection light 92, which has been reflected in an effective direction by the light valve 2, onto a screen 9.

One of the examples of the projector 1 is a single-panel video projector that uses a DMD (digital mirror device) as the light valve 2 and the light emitting system 3 includes a light source 4 such as white LEDs and a disc-shaped rotating color splitting filter (or "color wheel") 5. Light of the three primary colors red, green, and blue becomes incident on the DMD (light valve) 2 according to time division. By controlling elements that correspond to individual pixels at the timing when the light of the respective colors is incident, a color image is displayed. The light emitting system 3 further includes an illumination lens system 7 that collects the light from the light source 4 and outputs non-telecentric illumination light 91 via a mirror 6 or the like to the DMD 2.

Figure 2:
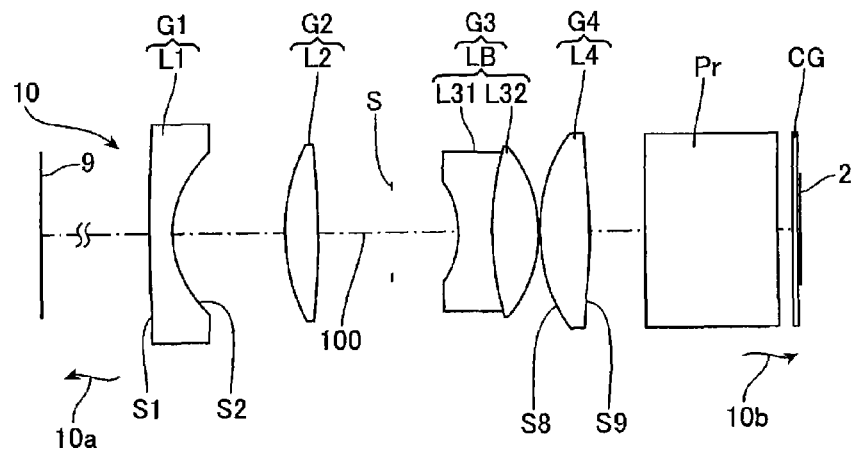
FIG. 2 shows an arrangement of the projector lens system.

FIG. 2 shows an arrangement of the projector lens system 10. This projector lens system 10 consists of, in order from the screen 9 side, a first lens group G1 with negative refractive power, a second lens group G2 with positive refractive power, a third lens group G3 with negative refractive power, and a fourth lens group G4 with positive refractive power.

The first lens group G1 that is closest to the screen 9 has an overall negative refractive power and is composed of a negative meniscus lens (the first negative lens) L1 that is made of resin and is convex on the screen 9 side. Both surfaces of the negative meniscus lens L1, that is the surface S1 on the screen 9 side and the surface S2 on the DMD 2 side, are aspherical. The negative meniscus lens L1 that composes of the first lens group G1 is the lens with the largest effective diameter (aperture) out of the projector lens system 10.

The second lens group G2 is a lens group that has an overall positive refractive power and is composed of a first positive lens L2 that is made of glass and is biconvex. An irregularly shaped stop S that is rotationally asymmetrical or asymmetrical in the left-right direction or the up-down direction is disposed on the DMD 2 side of the second lens group G2 and blocks stray light (flat state light) from the light emitting system 3.

The third lens group G3 is a lens group that has an overall negative refractive power and is composed of a cemented doublet lens (balsam lens) LB. The cemented lens LB is constructed, in order from the subject 9 side, of a negative lens (the second negative lens) L31 that is made of glass and is biconcave and a second positive lens L32 that is made of glass and is biconvex. The third lens group G3 includes the negative lens L31 that is the lens with the smallest effective diameter (aperture) in the projector lens system 10.

The fourth lens group G4 that is closest to the DMD 2 is a lens group with an overall positive refractive power and is composed of a third positive lens L4 that is made of resin and is biconvex. Both surfaces of the third positive lens L4, that is the surface S8 on the screen 9 side and the surface S9 on the DMD 2 side, are aspherical. On the DMD 2 side of the fourth lens group G4, a TIR prism Pr that makes the incident projection light 92 telecentric and a cover glass CG composed of a single sheet of glass are disposed in order from the screen 9 side. Note that the cover glass CG is not limited to a single sheet and multiple sheets may be disposed.

The projector lens system 10 is composed, in order from the screen 9 side, of five lenses L1, L2, L31, L32, and L4 that are grouped into the four lens groups G1 to G4 with negative, positive, negative, and positive refractive powers. This projector lens system 10 is a single-focus (fixed focus) type lens system that is incapable of zooming, and is a front-focus type lens system where focus adjustments are made (i.e., focusing is performed) by (outwardly or inwardly) moving only the negative meniscus lens L1 of the first lens group G1 along the optical axis 100. In this lens system 10, it is unnecessary to rotate or move the other lenses L2 to L4 and the stop S except the lens L1, and possible to easily dispose the irregularly shaped stop S, which is rotationally asymmetrical, at low cost.

In the projector lens system 10, negative and positive refractive powers are arranged on the respective sides of the irregularly shaped stop S by the first lens group G1 and the second lens group G2 on the screen side and by the third lens group G3 and the fourth lens group G4 on the DMD side. Such arrangement is an asymmetrical arrangement of refractive powers on the respective sides of the irregularly shaped stop S.

A lens system like this with an asymmetrical arrangement of powers on the respective sides of the stop is wide angle, is easy to make telecentric on the incident side, and facilitates achievement of a sufficient back focus. However, such asymmetrical arrangement of powers may cause a tendency for various aberrations to increase. If the number of lenses is increased to correct such aberrations, the size of the lens system is increased.

In this projector lens system 10, such disadvantages are solved by the arrangement from the view point of the power balance and lens materials. That is, in the project lens system 10, the negative meniscus lens L1 and the third positive lens L4 that are made of resin and have low refractive indices are disposed at both sides (i.e., at both ends) of the projector lens system 10, that is, at a position closest to the screen 9 (the enlarging side 10a) and a position closest to the DMD 2 (the reducing side 10b). The first positive lens L2, the negative lens L31 and the second positive lens L32 that are made of glass and have high refractive indices are disposed between the negative meniscus lens L1 and the third positive lens L4. That is, a configuration is used where the second lens group G2 and the third lens group G3 that have high refractive indices are sandwiched by the first lens group G1 and the fourth lens group G4 that have low refractive indices.

More detail, the projector lens system 10 is designed so that the refractive index n1 of the first negative lens (negative meniscus lens) L1, the refractive index n2 of the first positive lens L2, the refractive index n32 of the second positive lens L32, and the refractive index n4 of the third positive lens L4 satisfy Conditions (1) to (6) below.

$$1.45 \leq n1 \leq 1.60 \quad (1)$$

$$1.45 \leq n4 \leq 1.60 \quad (2)$$

$$0.16 \leq n2-n1 \leq 0.31 \quad (3)$$

$$0.16 \leq n32-n4 \leq 0.31 \quad (4)$$

$$0.95 \leq n1/n4 \leq 1.05 \quad (5)$$

$$0.95 \leq n2/n32 \leq 1.05 \quad (6)$$

As shown by Conditions (1) to (4), in the projector lens system 10, the refractive index n1 of the negative meniscus lens L1 and the refractive index n4 of the third positive lens L4 that are both made of resin are set low and the refractive index n2 of the first positive lens L2 and the refractive index n32 of the second positive lens L32 that are both made of glass are set high. According to Condition (5), the refractive index n1 of the negative meniscus lens L1 and the refractive index n4 of the third positive lens L4 are set so as to be substantially balanced (i.e., substantially equal), and according to Condition (6), the refractive index n2 of the first positive lens L2 and the refractive index n32 of the second positive lens L32 are set so as to be substantially balanced (i.e., substantially equal).

This means that in the projector lens system 10, although powers are arranged asymmetrically on the respective sides of the stop S, by sandwiching the first positive lens L2 and the second positive lens L32 that have substantially equal high refractive indices between the negative meniscus lens L1 and the third positive lens L4 that have substantially equal low refractive indices, it is possible to make the arrangement of refractive indices symmetrical on the respective sides of the stop S.

This symmetrical arrangement causes to reduce the Petzval sum of the entire lens system by having the Petzval factors of the first lens group G1 and fourth lens group G4, and that of the second lens group G2 and third lens group G3 cancel each other out, which makes it possible to favorably correct various aberrations such as curvature of field. This means that it is possible to provide a high-performance projector lens system 10 while using a total of five lenses that lenses configuration becomes compact. The projector lens system 10 is also low-cost by using two lenses, i.e., the second meniscus lens L1 and the third positive lens L4, that are made of resin.

In addition, in the projector lens system 10, by disposing the cemented lens LB in the third lens group G3, the chromatic aberration correcting performance on the reducing side 10b of the stop S is improved and can complement the chromatic aberration on the enlarging side 10a of the stop S where the first positive lens L2, which is made of glass, has a high refractive index, and is highly dispersive, in the second lens group G2 is disposed. Accordingly, even if the power configurations are asymmetrical between the enlarging side 10a and the reducing side 10b of the stop S, it is possible to have the symmetrical refractive index configurations on both sides of the stop S by disposing glass made first positive lens L2 on the enlarging side 10a.

In addition, in the projector lens system 10, since both surfaces S1 and S2 of the negative meniscus lens L1 disposed closest to the enlarging side 10a (the screen 9 side) are aspherical, it is possible to favorably correct distortion that is produced due to the arrangement of power being asymmetrical on both sides of the irregularly shaped stop S.

Also, in the projector 1 equipped with the projector lens system 10, since white LEDs are used as the light source 4 of the light emitting system 3, there is little emission of heat and it is possible to suppress fluctuations in the lens performance due to heat even when the third positive lens L4 disposed closest to the reducing side 10b (the DMD 2 side) is a low-cost lens made of resin. It is also easy to provide a projector lens system 10 for which fluctuations in back focus due to temperature fluctuations are suppressed.

If the upper limits of Conditions (1) and (2) are exceeded, since the refractive index n1 of the negative meniscus lens L1 and the refractive index n4 of the third positive lens L4 that are made of resin become excessively high, the specific gravity of the lenses is large, which makes cost reductions difficult. On the other hand, if the lower limits of Conditions (1) and (2) are exceeded, since the refractive index n1 and the refractive index n4 become excessively low, the Petzval sum increases in the negative direction and the curvature of field characteristics deteriorate, making correction difficult.

If the upper limit of Condition (3) is exceeded, the refractive index n2 of the first positive lens L2 becomes excessively high relative to the refractive index n1 of the negative meniscus lens L1, which makes cost reductions difficult. In the same way, if the upper limit of Condition (4) is exceeded, the refractive index n32 of the second positive lens L32 becomes excessively high relative to the refractive index n4 of the third positive lens L4, which makes cost reductions difficult. On the other hand, if the lower limits of Conditions (3) and (4) are exceeded, the balance between the refractive indices on the enlarging side 10a and the reducing side 10b on the respective sides of the stop S is destroyed, which makes it difficult to lower the Petzval sum.

If the upper limits of Conditions (5) and (6) are exceeded, since the refractive index n1 of the negative meniscus lens L1 is excessively high relative to the refractive index n4 of the third positive lens L4 and the refractive index n2 of the first positive lens L2 is excessively high relative to the refractive index n32 of the second positive lens L32, the balance between the refractive indices on the respective sides of the stop S is destroyed, which makes it difficult to lower the Petzval sum. In the same way, if the lower limits of Conditions (5) and (6) are exceeded, the refractive index n1 is excessively low relative to the refractive index n4 and the refractive index n2 is excessively low relative to the refractive index n32, resulting in the balance between the refractive indices on both sides of the irregularly shaped stop S being destroyed, which makes it difficult to lower the Petzval sum.

The upper limit of Condition (1) should preferably be 1.57 or more preferably 1.55. The lower limit of Condition (1) should preferably be 1.47 or more preferably 1.50. The upper limit of Condition (2) should preferably be 1.57 or more preferably 1.55. The lower limit of Condition (2) should preferably be 1.47 or more preferably 1.50.

The upper limit of Condition (3) should preferably be 0.28. The lower limit of Condition (3) should preferably be 0.18 or more preferably 0.20. The upper limit of Condition (4) should preferably be 0.28. The lower limit of Condition (4) should preferably be 0.18 or more preferably 0.20.

The upper limit of Condition (5) should preferably be 1.03 or more preferably 1.02. The lower limit of Condition (5) should preferably be 0.97 or more preferably 0.98. The upper limit of Condition (6) should preferably be 1.03 or more preferably 1.02. The lower limit of Condition (6) should preferably be 0.97 or more preferably 0.98.

Figure 3:
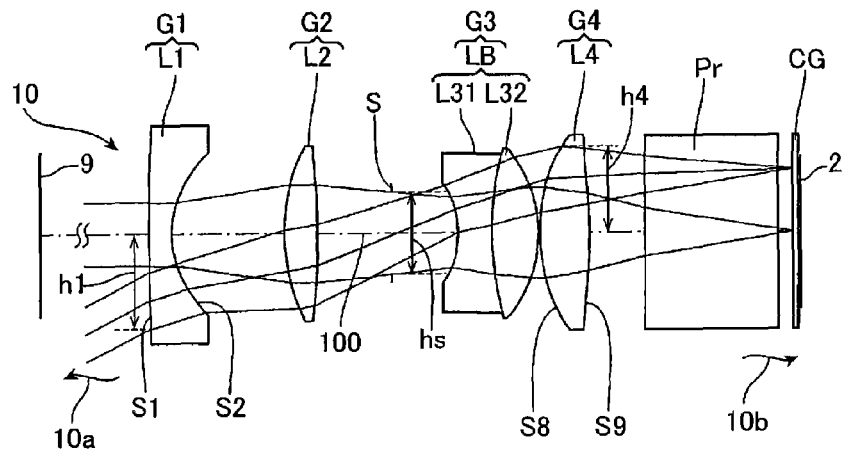
FIG. 3 is a diagram of showing rays in the projector lens system.

FIG. 3 is a ray diagram for the projector lens system 10. This projector lens system 10 is designed so that the maximum effective ray height h1 of the negative meniscus lens L1, the aperture diameter hs of the irregularly shaped stop S, and the maximum effective ray height h4 of the third positive lens L4 satisfy Conditions (7) and (8).

$$1.00 \leq h1/hs \leq 1.20 \quad (7)$$

$$1.00 \leq h4/hs \leq 1.20 \quad (8)$$

With the projector lens system 10, by setting the parameters within the ranges of Conditions (7) and (8), it is possible to make the effective diameters of ray-passing on the enlarging side 10a and the reducing side 10b of the stop S substantially equal, which means that it is possible to provide the projector lens system 10 that suppresses the drop in peripheral light and is compact and bright.

If the upper limits of Conditions (7) and (8) are exceeded, since the maximum effective ray height h1 of the negative meniscus lens L1 and the maximum effective ray height h4 of the third positive lens L4 become large relative to the diameter hs of the irregularly shaped stop S, the effective diameters of the negative meniscus lens L1 and the third positive lens L4 increase and it becomes difficult to miniaturize the projector lens system 10. On the other hand, if the lower limits of Conditions (7) and (8) are exceeded, since the maximum effective ray height h1 and the maximum effective ray height h4 become small relative to the diameter hs of the irregularly shaped stop S, there is a drop in peripheral light and it becomes difficult to make the projector lens system 10 bright.

Note that the expression "maximum effective ray height" in the present specification refers to the height of a ray that passes a furthest position from the optical axis 100, and the "aperture diameter hs" of the irregularly shaped stop S refers to the largest length (diameter) across the aperture.

The upper limit of Condition (7) should preferably be 1.18. The lower limit of Condition (7) should preferably be 1.10 or more preferably 1.15. The upper limit of Condition (8) should preferably be 1.15 or more preferably 1.10. The lower limit of Condition (8) should preferably be 1.05.

FIG. 4 shows lens data of the respective lenses of the projector lens system 10. FIGS. 5A and 5B show various numerical values for the projector lens system 10. In the lens data, "Ri" represents the radius of curvature (mm) of each lens (i.e., each lens surface) disposed in order from the screen 9 side, "di" represents the distance (mm) between the respective lens surfaces disposed in order from the screen 9 side, "nd" represents the refractive index (d line) of each lens disposed in order from the screen 9 side, and "vd" represents the Abbe number (d line) of each lens disposed in order from the screen 9 side. In FIG. 4, "Flat" indicates a flat surface. In FIG. 5B, "En" represents "10 to the power n". As one example, "E-05" represents "10 to the power −5".

Both surfaces S1 and S2 of the negative meniscus lens L1 disposed closest to the enlarging side 10a (the screen 9 side) and both surfaces S8 and S9 of the third positive lens L4 disposed closest to the reducing side 10b (the DMD 2 side) are aspherical. The aspherical surfaces are expressed by the following expression using the coefficients K, A, B, C, and D shown in FIG. 5B with X as the coordinate in the optical axis direction, Y as the coordinate in a direction perpendicular to the optical axis, the direction in which light propagates as positive, and R as the paraxial radius of curvature. This is also the case for the embodiments described later.

$$X = (1/R)Y^2/[1+\{1-(1+K)(1/R)^2Y^2\}^{1/2}]+AY^4+BY^6+CY^8+DY^{10}$$

The various values in the equations given in Conditions (1) to (8) described above for the projector lens system 10 according to the present embodiment are as follows.

| | |
|---|---|
| n1=1.53 | Condition (1) |
| n4=1.53 | Condition (2) |
| n2−n1=0.27 | Condition (3) |
| n32−n4=0.27 | Condition (4) |
| n1/n4=1.00 | Condition (5) |
| n2/n32=1.00 | Condition (6) |
| h1/hs=1.18 | Condition (7) |
| h4/hs=1.06 | Condition (8) |

The projector lens system 10 according to the present embodiment satisfies Conditions (1) to (8).

Figure 6:
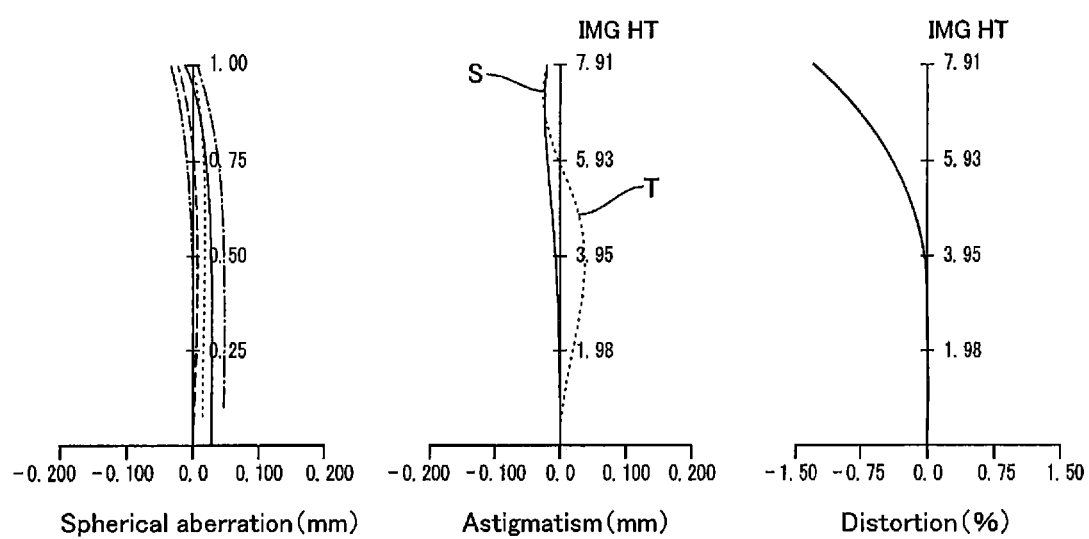
FIG. 6 is a series of graphs showing longitudinal aberration of the projector lens system.

FIG. 6 is a series of graphs showing longitudinal aberration of the projector lens system 10. As shown in FIG. 6, various aberrations are all favorably corrected and it is possible to project high-quality images onto the screen 9. Note that spherical aberration is shown for the respective wavelengths of 870 nm (dot-dash line), 623 nm (solid line), 586 nm (dot-dot-dash line), 462 nm (dashed line), and 440 nm (dotted line). In addition, astigmatism is shown separately for tangential rays (T) and sagittal rays (S).

Accordingly, in spite of having a compact construction of five lenses where the reducing side 10b is telecentric, the projector lens system 10 according to the present embodiment is bright with an f number of 2.00 and capable of projecting sharp images, making it one example of a projector lens system 10 with a favorable balance between cost and performance.

Note that the projector lens system 10 according to the present invention can also be incorporated in a three-panel projector in which light from the light source 4 is split into three colors by dichroic filters (mirrors) or the like.

The light modulator (light valve) 2 may be any device capable of forming an image, such as an LCD (liquid crystal panel), a digital mirror device (DMD) or a self-emission type organic EL, and may be a single panel or may be a type where images of respective colors are combined by dichroic prisms or the like.

As the light source 4, it is possible to use LEDs of the three primary colors red, green and blue, a halogen lamp, an HID lamp, a xenon lamp, or the like. By having LEDs of the three primary colors flash at the speed of light, it is possible to omit the single plate-type color wheel 5.

The screen 9 may be a wall surface, a white board, or the like, and the projector 1 may be a front projector, or may be a rear projector including a screen.

Note that the present invention is not limited to the embodiment described above and includes the scope of the patent claims and its equivalents.

The invention claimed is:

1. A projector lens system that projects projection light from a light modulator onto a screen, the projector lens system comprising, in order from a screen side thereof:
    a first negative lens that is made of resin and is convex on the screen side, both surfaces of the negative meniscus lens being aspherical;
    a first positive lens that is made of glass and is biconvex;
    a stop;
    a cemented lens that has negative refractive power and is composed, in order from the screen side, of a second negative lens that is made of glass and is biconcave and a second positive lens that is made of glass and is biconvex; and
    a third positive lens that is made of resin and is biconvex, both surfaces of the third positive lens being aspherical,
    wherein a refractive index n1 of the first negative lens, a refractive index n2 of the first positive lens, a refractive index n32 of the second positive lens, and a refractive index n4 of the third positive lens satisfy the following conditions $1.45 \leq n1 \leq 1.60$, $1.45 \leq n4 \leq 1.60$, $0.16 \leq n2-n1 \leq 0.31$, $0.16 \leq n32-n4 \leq 0.31$, $0.95 \leq n1/n4 \leq 1.05$, and $0.95 \leq n2/n32 \leq 1.05$.

2. The projector lens system according to claim 1, wherein the projector lens system further satisfies the following conditions $1.50 \leq n1 \leq 1.55$, $1.50 \leq n4 \leq 1.55$, $0.20 \leq n2-n1 \leq 0.28$, $0.20 \leq n32-n4 \leq 0.28$, $0.98 \leq n1/n4 \leq 1.02$, and $0.98 \leq n2/n32 \leq 1.02$.

3. The projector lens system according to either claim 1, wherein a maximum effective ray height h1 of the first negative lens, a diameter hs of the stop, and a maximum effective ray height h4 of the third positive lens satisfy the following conditions $1.00 \leq h1/hs \leq 1.20$, and $1.00 \leq h4/hs \leq 1.20$.

4. The projector lens system according to claim 3, wherein the projector lens system satisfies the following conditions $1.15 \leq h1/hs \leq 1.18$, and $1.05 \leq h4/hs \leq 1.10$.

5. A projector comprising:
    the projector lens system according to claim 1;
    the light modulator; and
    a lighting system that emits light onto the light modulator.

6. The projector according to claim 5, wherein the lighting system includes an LED light source.

* * * * *